2,845,395

RECLAIMING VULCANIZED RUBBER IN THE PRESENCE OF UNVULCANIZED HIGH STYRENE POLYMERIC MATERIAL AND PRODUCT

Edward F. Sverdrup, Buffalo, N. Y., assignor to U. S. Rubber Reclaiming Co. Inc., Buffalo, N. Y.

No Drawing. Application April 20, 1954
Serial No. 424,491

10 Claims. (Cl. 260—2.3)

This invention relates to the reclaiming of rubber, to improved rubber-containing products, and to correlated improvements and discoveries appertaining thereto.

Although there are a variety of rubbers or rubber-like materials and a variety of plastics whose properties differ from rubber, there is an even greater variety of need for materials having particular properties.

There is today an especially great need in the mechanical arts for hard, tough, non-metallic materials of the "rigid plastic" type; and there is also a wide need in the electrical arts for materials of such character which have good electrical insulating properties.

Pursuant to the present invention, highly-desirable hard, tough, non-metallic materials of the rigid plastic type may be effectively and economically produced by combining with vulcanized rubber scrap during the reclaiming thereof a "high-styrene polymeric material." The latter term as used herein is reserved for copolymers of styrene with butadiene wherein the styrene constitutes from 50% to 100% by weight of the polymeric material, a minimum of 70% being preferred as can be seen from the examples; and, when 100% is reached, the polymeric material consists of polystyrene. Good results may be obtained by the use of a weight of plastic equal to the weight of defiberized whole-tire scrap, or twice the weight of the rubbery hydrocarbon content thereof or of whatever other scrap may be used. In this connection it is understood that the term "hydrocarbon content" is used herein in its ordinary sense in the rubber art as including hydrocarbon with combined sulfur as well as uncombined hydrocarbon. The polymeric material may be used in raw or scrap form and may be used in amounts down to 10% of the rubbery hydrocarbon content of the scrap rubbery material.

All types of scraps, including those containing natural rubber, GR–S, butyl rubber, polybutadiene, and elastomers contained in tires and tubes, are utilized in accordance with the invention.

Various reclaiming procedures may be employed. Mechanical working of the scrap is of advantage in the formation of the product, as is heat (e. g., temperatures from about 200° F. or 250° F. to 500° F. as externally measured), whether generated by the working or supplied externally. A highly desirable procedure is described in Patent 2,653,915 issued to Joseph C. Elgin and me on September 29, 1953.

Products having many of the advantages of hard rubber and other special advantages are obtained when sulfur (e. g., from 3% to 10%), based on the rubbery hydrocarbon content of the scrap, is included in the mix which is subjected to heat (e. g., temperatures of from 250° F. to 500° F. as externally measured) and, preferably also, mechanical action. This sulfur appears to enter into combination during the reaction, but the product of the reaction nevertheless has the qualities of a thermoplastic material as contrasted with a vulcanized polymer. Additional sulfur is added to provide the final hard, vulcanized product. Enough sulfur may be added to bring the total added sulfur (including that added to the mix as above) up to a total of from 5 parts to 47 parts by weight of sulfur with respect to the rubbery hydrocarbon content of the final mix. Desirably, from 5 parts to 40 parts of sulfur (based on the hydrocarbon content of the final mix) may be added at this time.

While there are given below certain specific examples of this invention and its application in practical use and also certain modifications and alternatives, it should be understood that these are not intended to be exhaustive or to be limiting of the invention. On the contrary, these illustrations and the explanations herein are given in order to acquaint others skilled in the art with this invention and the principles thereof and a suitable manner of its application in practical use, so that others skilled in the art may be enabled to modify the invention and to adapt it and apply it in numerous forms, each as may be best suited to the requirement of a particular use.

EXAMPLE 1

100 parts of similar whole-tire crumb were mixed with 10 parts of a reclaiming acid (for example PDO–40 a rubber reclaiming agent composed of polymerized olefinic hydrocarbons generally cyclic in character), 2 parts of resin acid derived from rosin and sold under the trade name "Sonastac" by the Southern Naval Stores Division of Leach Brothers, Inc., 3 parts of sulfur, and 8.75 parts of high-styrene butadiene-copolymer (70% styrene–30% butadiene) (Darex Copolymer 3). This mixture was then passed thru a 3" plasticator as set forth in said Patent 2,653,915, whose jacket temperature was 300° F., at a rate of 36#/hr. The process temperature was about 308° F. as measured by a thermocouple placed approximately in the center of the barrel and next externally to the liner.

EXAMPLE 2

100 parts of similar whole-tire crumb were mixed with 10 parts of PDO–40, 2 parts of resin acid (Sonastac), 3 parts of sulfur and 17.50 parts of high-styrene butadiene copolymer (70% styrene–30% butadiene) (Darex Copolymer 3). This mixture was then passed thru a 3" plasticator as set forth in said Patent 2,653,915, whose jacket temperature was 300° F., at a rate of 41#/hr. The process temperature was about 311° F. as measured by a thermocouple placed approximately in the center of the barrel and next externally to the liner.

EXAMPLE 3

100 parts of similar whole-tire crumb were mixed with 10 parts of PDO–40, 2 parts of resin acid (Sonastac), 3 parts of sulfur and 8.75 parts of high-styrene butadiene copolymer (85% styrene–15% butadiene) (Darex Copolymer 43G). This mixture was then passed thru a 3" plasticator as set forth in said Patent 2,653,915, whose jacket temperature was 300° F., at a rate of 45#/hr. The process temperature was about 324° F. as measured by a thermocouple placed approximately in the center of the barrel and next externally to the liner.

EXAMPLE 4

100 parts of similar whole-tire crumb were mixed with 10 parts PDO–40, 2 parts of resin acid (Sonastac), 3 parts of sulfur, and 17.50 parts of high-styrene butadiene copolymer (85% styrene–15% butadiene) (Darex Copolymer 43G). This mixture was then passed thru a 3" plasticator as set forth in said Patent 2,653,915, whose jacket temperature was 300° F., at a rate of 35#/hr. The process temperature was about 322° F.

as measured by a thermocouple placed approximately in the center of the barrel and next externally to the liner.

In the following table there are shown results obtained when the products of Examples 3–6 are vulcanized as shown:

Table I

Test compound:
Product of example _____ 100.0
Sulfur _____ 14.0
Warner lime _____ 5.6
Aldehyde-amine type accelerator (A–32) _____ 0.6

| Cure Min. at 338° F. | Example 3 | | | Example 4 | | |
|---|---|---|---|---|---|---|
| | Tensile | Elongation | Shore Hardness | Tensile | Elongation | Shore Hardness |
| 10 | 4,350 | 2.1 | 85 | 4,370 | 2.0 | 85 |
| 15 | 5,090 | 1.3 | 86 | 4,710 | 1.5 | 86 |
| 25 | 4,220 | 0.8 | 87 | 4,750 | 1.1 | 87 |
| Cured 20' at 340 Peak temperature, ° F. | 392 | | | 378 | | |
| Acetone extract | 10.0 | | | 10.2 | | |
| Free sulfur | 0.18 | | | 0.23 | | |
| Condition of cures | good | | | good | | |

| Cure Min. at 338° F. | Example 5 | | | Example 6 | | |
|---|---|---|---|---|---|---|
| | Tensile | Elongation | Shore Hardness | Tensile | Elongation | Shore Hardness |
| 10 | 3,720 | 1.2 | 86 | 4,640 | 1.3 | 86 |
| 15 | 4,210 | 1.2 | 87 | 4,590 | 0.8 | 87 |
| 25 | 4,700 | 1.4 | 87 | 5,120 | 0.8 | 86 |
| Cured 20' at 340 Peak temperature, ° F. | 386 | | | 382 | | |
| Acetone extract | 10.1 | | | 10.5 | | |
| Free sulfur | 0.17 | | | 0.14 | | |
| Condition of cures | good | | | good | | |

EXAMPLE 5

100 parts of similar whole-tire crumb were mixed with 87.5 parts of a copolymer of 90% styrene and 10% butadiene sold under the trade name "Pliolite S–6" by the Goodyear Tire and Rubber Company, 5 parts of sulfur, and 5 parts of lime on a hot mill (temperature approximately 150–170° C.) for about 25'. The cure was 30' at 338° F. A hardness of 81 Shore "D" was obtained.

EXAMPLE 6

100 parts of similar whole-tire crumb were mixed with 12.50 parts of polystyrene (Monsanto's Lustrex LM–3) having a molecular weight range from 65,000 to 70,000, 8.0 parts of PDO–40, 2.0 parts of a plasticizer consisting essentially of resin acid derived from rosin modified by the addition of terpene, which plasticizer is sold under the trade name of "Turgum" by the J. M. Huber Corporation and 4.0 parts of sulfur. This mixture was then passed thru a 3" plasticator as set forth in said Patent 2,653,915, whose jacket temperature was 350° F., at a rate of about 30#/hr. and a process temperature of about 390° F. The resulting product when cured in the following formulation:

Product of Example 8 _____ 100.0
Sulfur _____ 14.0
Warner lime _____ 5.6
Accelerator (A–32, a butyraldehyde and butylidene aniline reaction product) _____ 0.6 gave a tensile strength of 3950#/sq. in., an elongation of 2%, and a Shore "D" hardness of 88.

I claim:
1. The process of reclaiming tire or tube scrap which comprises mixing the vulcanized rubber scrap with from 10% to 200%, based on the rubbery hydrocarbon content of the scrap, of an unvulcanized high-styrene polymeric material which is of the class consisting of styrene-butadiene copolymers and polystyrene and wherein styrene constitutes not substantially less than 70% by weight of the polymeric material, and plasticizing the mixture by the masticating action of heat-generating mechanical working at a temperature of from 200° F. to 500° F. to produce a vulcanizable product.

2. A process as set forth in claim 1 wherein the polymeric material is a styrene-butadiene copolymer.

3. A process as set forth in claim 1 wherein the polymeric material is polystyrene.

4. The product of the process of claim 1.

5. A process as set forth in claim 1 wherein the product is thereafter vulcanized.

6. The product of the process of claim 5.

7. A process as set forth in claim 1 wherein from 3% to 10% of sulfur is included in the mix subjected to the masticating action of the mechanical working.

8. The product of the process of claim 7.

9. A process as set forth in claim 7 wherein the product is thereafter vulcanized in the presence of additional sulfur.

10. A hard molded product formed by the process of claim 9.

References Cited in the file of this patent

UNITED STATES PATENTS 2,535,931    Kelly _____ Dec. 26, 1950
2,653,915    Elgin et al. _____ Sept. 29, 1953

OTHER REFERENCES

India Rubber World (New York), March 1946, vol. 113, No. 6, pages 799 through 801.

Rubber Age, November 1947, page 200.

Comes, India Rubber World, May 1951, vol. 124, No. 2, pages 175 through 177.